United States Patent [19]

Poore et al.

[11] Patent Number: 4,967,716
[45] Date of Patent: Nov. 6, 1990

[54] INTERNAL COMBUSTION ENGINE WITH INTEGRAL INTERCOOLER

[75] Inventors: Bernard B. Poore, East Moline; Howard V. Beitel, Moline, both of Ill.; Michael S. Weinert, Bettendorf, Iowa

[73] Assignee: Deere & Company, Moline, Ill.

[21] Appl. No.: 343,564

[22] Filed: Apr. 27, 1989

[51] Int. Cl.⁵ ............................................. F02B 33/00
[52] U.S. Cl. ........................................ 123/563; 60/599
[58] Field of Search ........................ 123/563; 60/599

[56] References Cited

U.S. PATENT DOCUMENTS

| | | |
|---|---|---|
| 2,858,666 | 11/1958 | Fullemann . |
| 2,889,682 | 6/1959 | Steven et al. . |
| 3,091,228 | 5/1963 | Maxwell . |
| 3,408,811 | 11/1968 | Wishart . |
| 3,881,455 | 5/1975 | Belsanti . |
| 3,976,041 | 8/1976 | Mettig et al. . |
| 4,000,725 | 1/1977 | Harris . |
| 4,028,892 | 6/1977 | Hinkle . |
| 4,075,991 | 2/1978 | Mettig et al. . |
| 4,191,148 | 3/1980 | Patel et al. . |
| 4,269,158 | 5/1981 | Berti . |
| 4,273,082 | 6/1981 | Tholen . |
| 4,303,052 | 12/1981 | Manfredo et al. . |
| 4,385,594 | 5/1983 | Hauser, Jr. . |
| 4,436,145 | 3/1984 | Manfredo et al. . |
| 4,452,216 | 6/1984 | Patchen, II et al. . |
| 4,476,842 | 10/1984 | Belsanti . |
| 4,513,695 | 4/1985 | Patchen, II . |
| 4,520,627 | 6/1985 | Reichenbach et al. . |
| 4,562,697 | 1/1986 | Lawson . |
| 4,565,177 | 1/1986 | Roettgen et al. . |

OTHER PUBLICATIONS

Deere & Company, "Fundamentals of Service-Engines", 1972, pp. 6–19.

Primary Examiner—Douglas Hart

[57] ABSTRACT

An engine includes a cylinder head which includes a portion which projects outwardly from a cylinder block in cantilevered manner. This cylinder head portion includes a channel which partially receives an intercooler. Coolant supply and return passages, an air inlet and a turbocharged air supply port extend through the cylinder head and communicate with the channel. A cover encloses the intercooler, its inlet and outlet coolant conduits and routes turbocharged air from the supply port to the air inlet.

6 Claims, 2 Drawing Sheets

INTERNAL COMBUSTION ENGINE WITH INTEGRAL INTERCOOLER

BACKGROUND OF THE INVENTION

The present invention relates to internal combustion engines of the piston type wherein turbocharged air is delivered to the engine via an intercooler.

An intercooler and its housing are difficult to incorporate into the overall design of an engine. Typically, such an intercooler will merely be attached to the outside of an engine with coolant pipes and air ducts positioned around the exterior of the engine in an exposed circuitous arrangement. Such an arrangement presents a cluttered appearance and the lengthy exposed coolant pipes and air ducts produce inefficiencies due to frictional losses.

SUMMARY OF THE INVENTION

An object of the present invention is to provide an engine-intercooler design with reduced frictional losses.

Another object of the present invention is to provide a compact engine-intercooler design with a minimum amount of exposed coolant pipes and air ducts.

These and other objects are achieved by the present invention wherein an engine cylinder head includes a portion which projects outwardly from the cylinder block in an overhanging or cantilevered fashion. This overhanging cylinder head portion includes a channel therein. Coolant supply and return passages, an air inlet and an air supply port are formed in the cylinder head and communicate with the channel. An intercooler is partially received in the channel and is connected with the coolant supply and return passages. A cover circumscribes the open end of the channel and encloses the intercooler, the coolant passages, the air inlet and the air supply port. The cover, the intercooler and the cylinder head are arranged so that turbocharged air from the air supply port is communicated to the air inlet via the intercooler.

DETAILED DESCRIPTION

Figure 1:
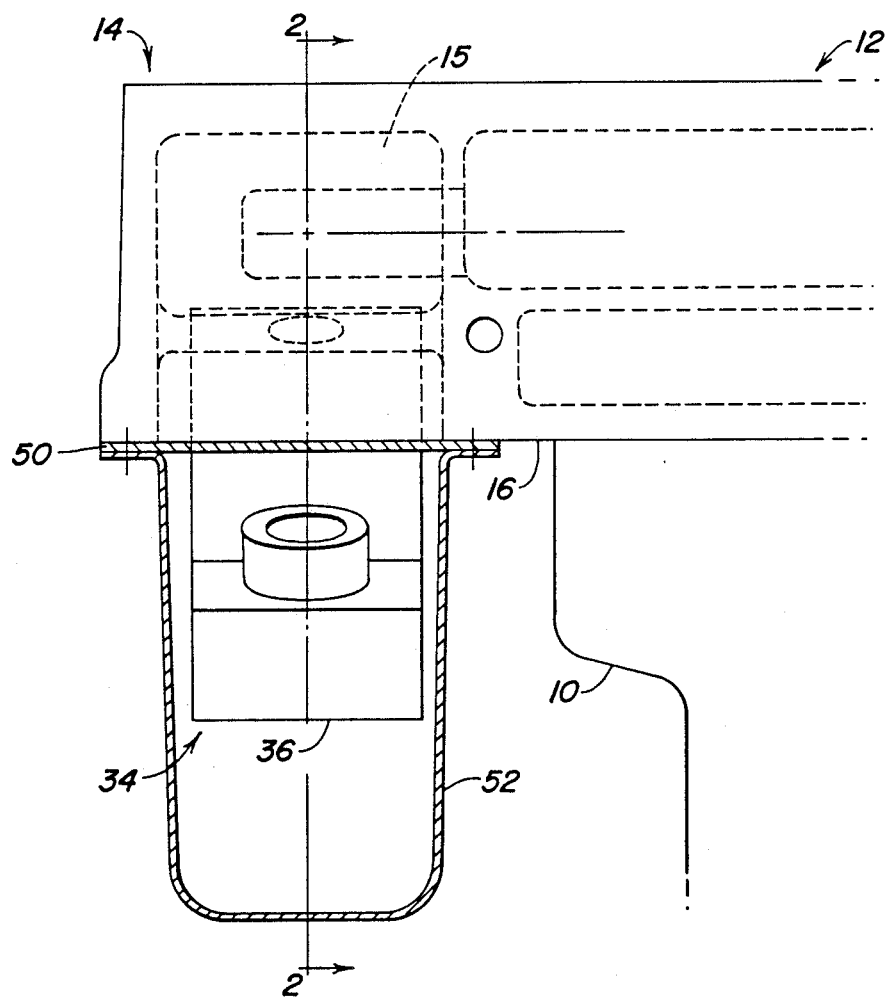
FIG. 1 is an end view showing a portion of an engine cylinder block and cylinder head including the present invention.
Figure 2:
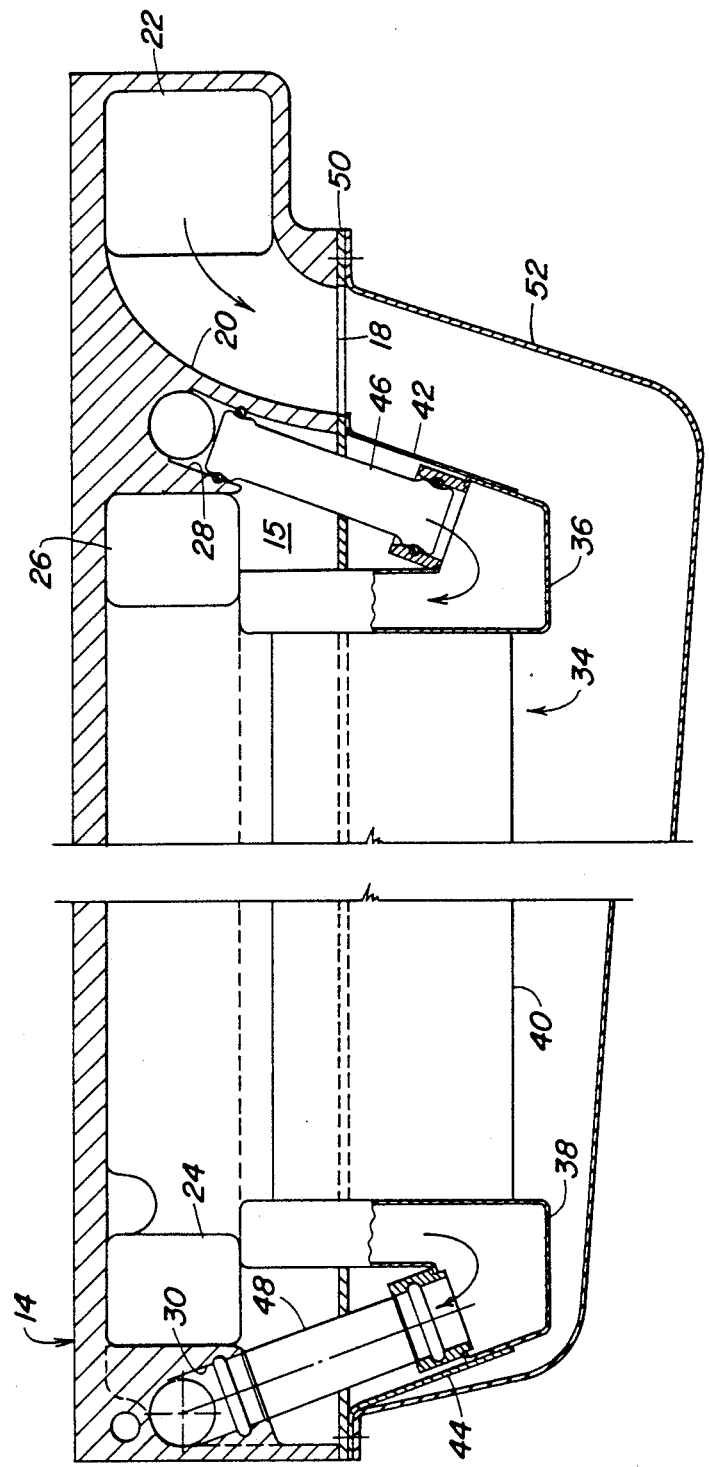
FIG. 2 is a view along lines 2—2 of FIG. 1.

An internal combustion engine includes a cylinder block 10 which contains a plurality of cylinder bores (not shown). A cylinder head 12 is secured to the upper end of the block 10 by conventional means (not shown). The head 12 includes an extension 14 which projects laterally from the block 10 in a cantilever manner. The head 12 and extension 14 have a substantially planar mounting surface 16, part of which is sealingly coupled to the block 10.

The extension 14 forms a cavity or channel 15 which is recessed from the surface 16.

The head 12 includes an air supply port 18 which opens in channel 15 and which receives turbocharged air from a turbocharger (not shown) via passages 20 and 22. Head 12 also includes front and rear engine air inlet ports 24 and 26 which communicate engine intake air to the cylinders (not shown). A coolant supply passage 28 extends through head 12 and opens into channel 15 adjacent air inlet port 26 and coolant return passage 30 extends through head 12 and opens into channel 15 adjacent air inlet 24. Passage 28 communicates with a coolant source (not shown) and passage 30 communicates with a coolant sump (not shown).

An intercooler 34 is partially received by channel 15 and includes an inlet header 36, an outlet header 38 and a heat exchange core 40 extending therebetween. The intercooler is anchored to the head 12 by mounting plates 42 and 44. A first pipe or conduit 46 connects inlet header 36 to supply passage 28 and conduit 48 connects outlet header 38 to return passage 30.

A sealing member or gasket 50 is attached to the portion of surface 16 which surrounds channel 15. A cover 52 is attached to head 12 so as to surround the lower open end of channel 15 and enclose the intercooler 34, air supply port 18, air inlets 24 and 26, coolant passages 28 and 30 and conduits 46 and 48. The cover 52, intercooler 34, and head 12 are arranged so that turbocharged air flows from port 18 to air inlets 24, 26 via intercooler 34.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

What is claimed is:

1. A liquid-cooled internal combustion engine comprising:
    a cylinder block;
    a cylinder head attached to the block and having formed therein a combustion air inlet, a coolant supply passage, a coolant return passage and an air supply passage for receiving turbocharged air;
    an intercooler having a coolant inlet and a coolant outlet;
    a first conduit communicating the intercooler coolant inlet with the coolant supply passage;
    a second conduit communicating the intercooler coolant outlet with the coolant return passage;
    a cover attachable to the cylinder head, the cover completely enclosing the intercooler and the first and second conduits; and
    the cover, the cylinder head and the intercooler being arranged so that turbocharged air flows from the air supply passage to the air inlet via the intercooler.

2. The invention of claim 1, wherein the cylinder head includes a first portion positioned over the cylinder block and a second portion projecting outwardly from the first portion, the intercooler and the cover being coupled to the second portion.

3. The invention of claim 2, wherein the cylinder head includes a planar attachment surface, the cylinder block engaging a first part of the attachment surface and the cover engaging a second part of the attachment surface.

4. The invention of claim 2, wherein: the second portion of the cylinder head forms a channel extending therein, the air inlet port opening into the channel and a portion of the intercooler being received by the channel.

5. The invention of claim 1, wherein: the coolant supply and return passages are positioned adjacent opposite ends of the air inlet.

6. A liquid-cooled internal combustion engine having a cylinder block, a cylinder head attached to the block, the cylinder head having a combustion air inlet formed therein, and an intercooler for cooling air supplied to the air inlet, characterized by:

the cylinder head having a coolant supply passage, a coolant return passage, said air inlet for communicating air to the engine for combustion and an air supply passage for receiving turbocharged air;

a first conduit communicating the coolant supply passage to a coolant inlet of the intercooler;

a second conduit communicating the coolant return passage with a coolant outlet of the intercooler;

a cover removably coupled to the cylinder head, the cover completely enclosing the intercooler and the first and second conduits;

the cover, the cylinder head and the intercooler being arranged so that engine combustion air flows from the air supply passage to the air inlet via the intercooler.

* * * * *